(No Model.) 2 Sheets—Sheet 1.
W. H. SAWYER.
ELECTRICAL CONDUCTOR.
No. 319,326. Patented June 2, 1885.
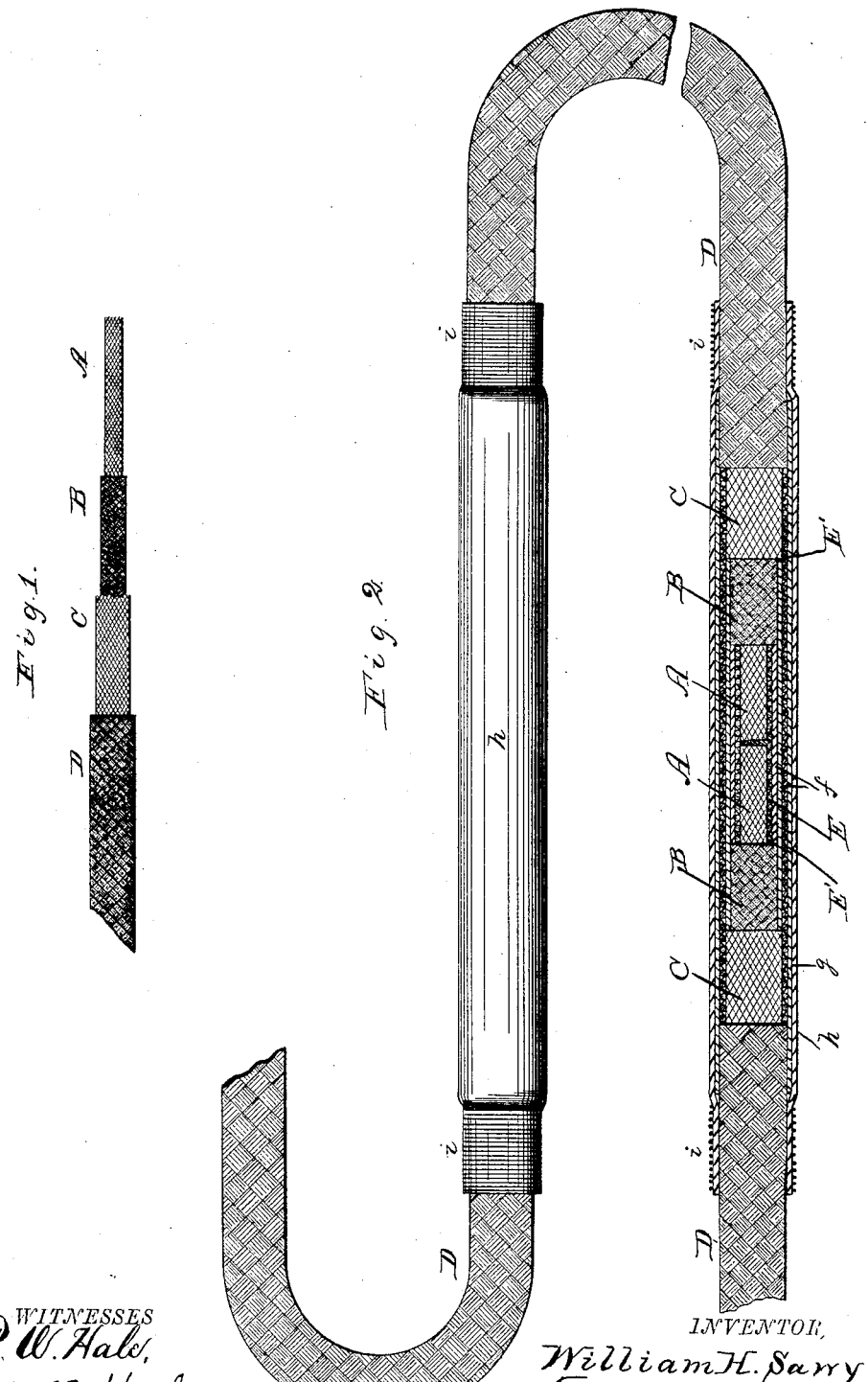
WITNESSES
P. W. Hale,
W. B. Hale
INVENTOR,
William H. Sawyer,
by Fred: W. Royce
Attorney (No Model.) 2 Sheets—Sheet 2.
W. H. SAWYER.
ELECTRICAL CONDUCTOR.
No. 319,326. Patented June 2, 1885.
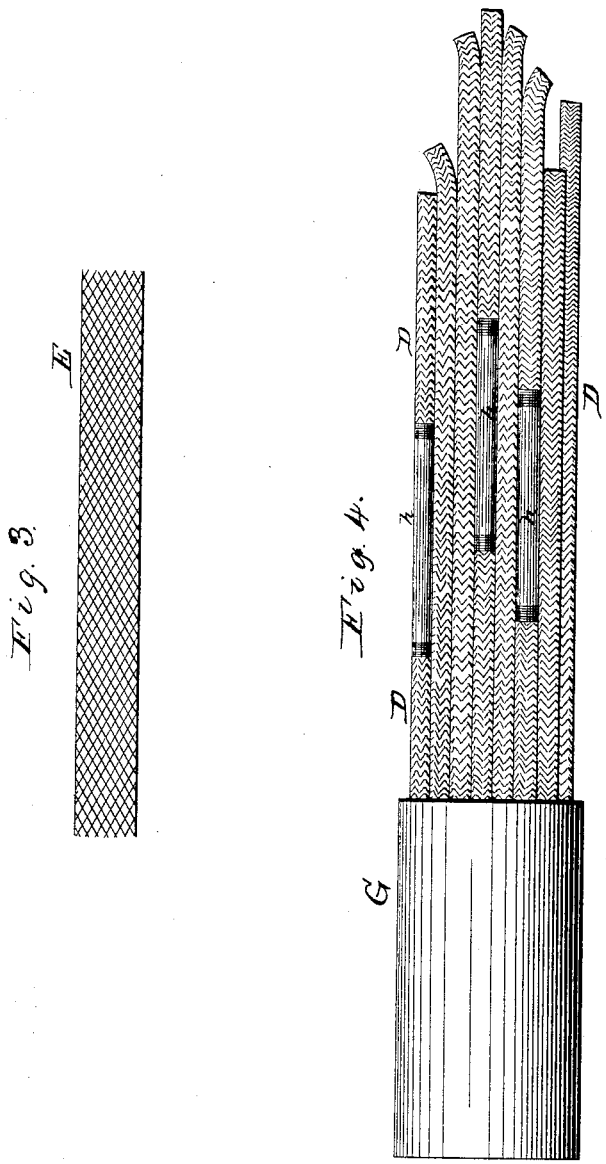
WITNESSES
P. W. Hale
W. B. Hale
INVENTOR
William H. Sawyer
by Fred: W. Royce
Attorney

UNITED STATES PATENT OFFICE.

WILLIAM H. SAWYER, OF PROVIDENCE, RHODE ISLAND.

ELECTRICAL CONDUCTOR.

SPECIFICATION forming part of Letters Patent No. 319,326, dated June 2, 1885.

Application filed September 17, 1884. (No model.)

*To all whom it may concern:*

Be it known that I, WILLIAM H. SAWYER, a citizen of the United States, residing at Providence, in the county of Providence and State of Rhode Island, have invented certain new and useful Improvements in Electrical Conductors, of which the following is a specification, reference being had therein to the accompanying drawings.

My invention relates to couplings for electric conductors, and has for its object to provide a strong, reliable, and readily-applied coupling for conductor-sections formed of braided wire.

The invention will be readily understood from the following particular description, in connection with the accompanying drawings, in which—

Figure 1 is a side elevation of a portion of a metallic circuit-conductor to which my improved coupling is especially intended to be applied. Fig. 2 is a view of three sections of conductor connected together by my improved coupling devices. Fig. 3 is a detached view of the braided-wire coupling-sleeve. Fig. 4 is a view of a cable of braided conductors in sections connected together by my improved couplings.

Referring now to Fig. 1, the letter A indicates the central conductor, which is composed of a number of wires braided together in tubular form after the manner of a whipcord. Surrounding this central conductor is an insulating-covering, B, preferably of braided cotton threads saturated with paraffine or other substance suitable for saturating the fibrous coverings of electrical conductors.

Upon the insulating-covering B is a braided covering or jacket, C, of wires similar to those that form the central conductor. This braided-wire jacket C forms one conducting member of the complete conductor, and outside of it is placed an insulating-covering, D, similar to the insulating-covering B of the central conductor.

The insulating-coverings may be formed of braided or wound fibrous threads saturated with a suitable protecting and insulating substance, or they may be formed of india-rubber, gutta-percha, or any other material suitable for the purpose. The manner of connecting the conducting members of such a conductor for use is well known, and therefore need not be particularly described.

When it is desired to connect together endwise two of the complete conductors or two sections thereof, the connection is accomplished by means of my improved coupling, heretofore referred to, and which is illustrated in Figs. 2 and 3, a sectional view being shown in Fig. 2.

The letter E in Fig. 3 designates a sleeve formed of braided wire. For each coupling of complete conductors, as heretofore described, two such sleeves will be required of different sizes, one being to fit the central conductor and the other to fit the outer conductor. In applying these sleeves to two conductors to be coupled, the central conductors, A, are bared for a proper length and inserted in a braided-wire sleeve, as shown in Fig. 2, and the exterior surface of the sleeve is then covered by winding with india-rubber cloth or tape, as shown at *f*, to supply the place of that portion of the insulating-covering which has been removed. Previously to connecting the central conductors the outer conductors must also be bared for a suitable length, and upon one of the conductor-sections, outside of the outer conductor, is slipped a braided-wire sleeve, E', considerably longer than the one which is to connect the central conductors. After the central conductors have been connected and their coupling-sleeve properly wrapped, the outer coupling-sleeve is drawn over the wrapping, so that it will bridge the same and lap over the outer conductors on each side thereof. This outer coupling-sleeve is then wrapped with rubber cloth or tape, as at *g*, to complete the insulating protecting-covering, and it may be inclosed in a suitable length of rubber or gutta-percha tubing, *h*, which has previously been slipped over one of the conductor-sections, so that it can be drawn over the outer coupling-sleeve after the latter has been placed in proper position. This rubber tube or wrapping of insulating material I prefer to have lap some distance beyond the coupling in both directions, and it should have its ends firmly bound with cords or wires, as at *i*. Both the coupling-sleeves should be tightly compressed upon the conductors in order that they may intermesh therewith and take firm hold thereof, so as to insure the proper action of the sleeves, as heretofore described.

It will be readily understood that a number of my improved metallic circuit-conductors may be combined in a cable as other conductors are. I have shown such a cable in Fig. 4, the conductors being simply laid parallel and inclosed in a protecting-sheathing, G.

Having now fully described my invention, what I claim is—

1. The combination, with two endwise adjacent braided coreless conductors, of the braided-wire coupling-sleeve embracing the adjacent ends of said conductors, substantially as described.

2. The combination, with the two endwise adjacent metallic circuit-conductors, each comprising two concentric braided conducting members insulated from each other, of the two braided-wire coupling-sleeves connecting corresponding conductors, and suitable insulation between said sleeves, substantially as described.

In testimony whereof I affix my signature in presence of two witnesses.

WILLIAM H. SAWYER.

Witnesses:
GILMAN E. JOPP,
W. A. HATHAWAY.